April 2, 1963  G. P. BUNN ETAL  3,083,669
MARINE VESSELS FOR VOLATILE LIQUIDS
Filed Oct. 19, 1959  4 Sheets-Sheet 1
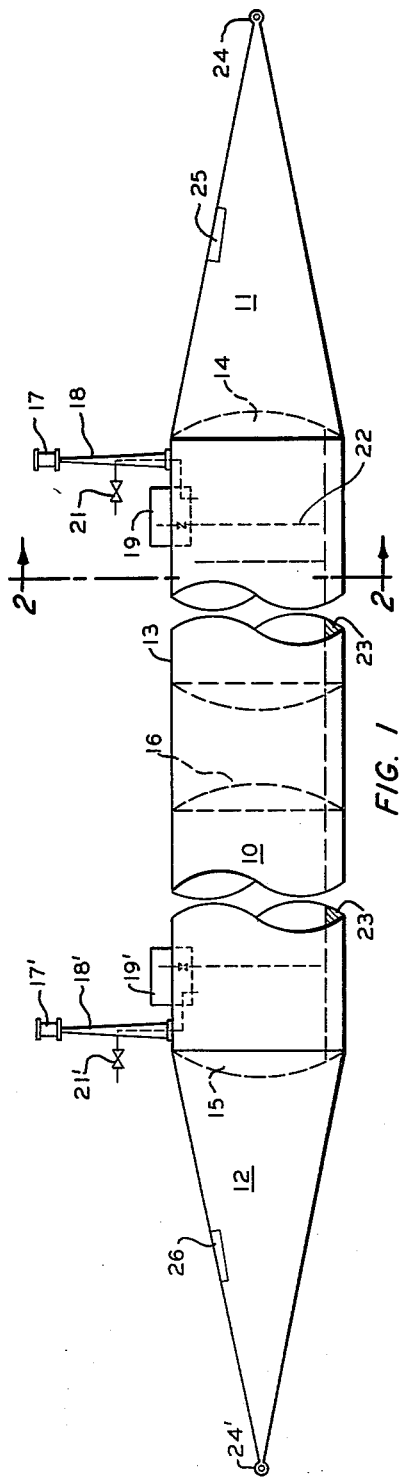
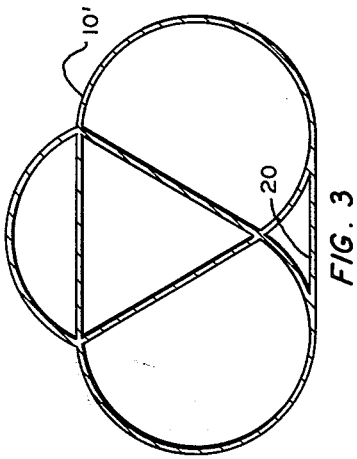
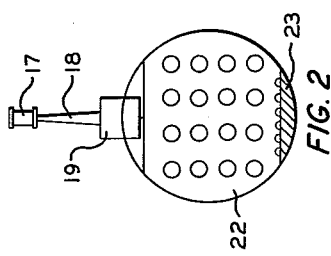
INVENTORS
G. P. BUNN
W. A. HARTMANN
BY *Hudson and Young*
ATTORNEYS

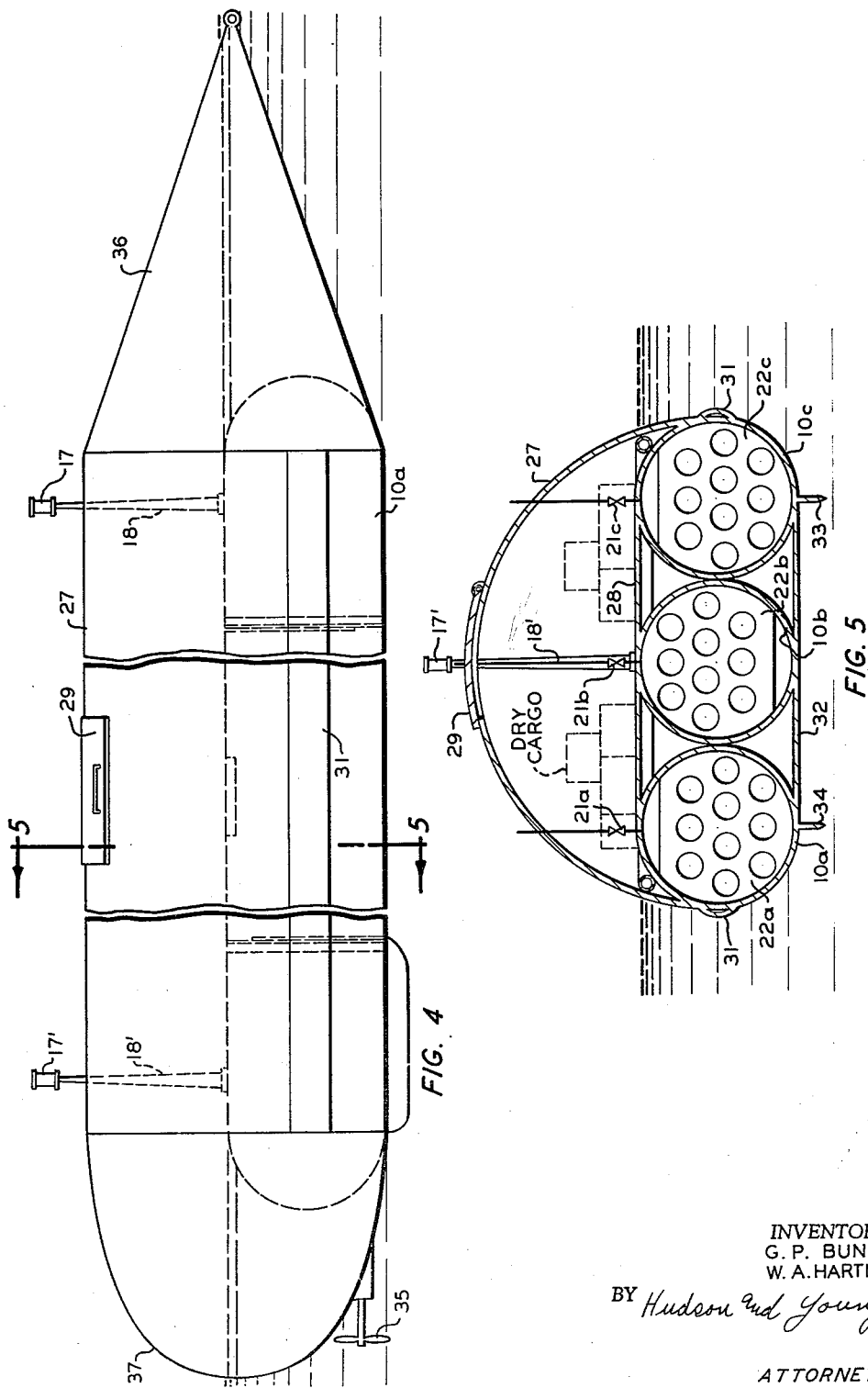

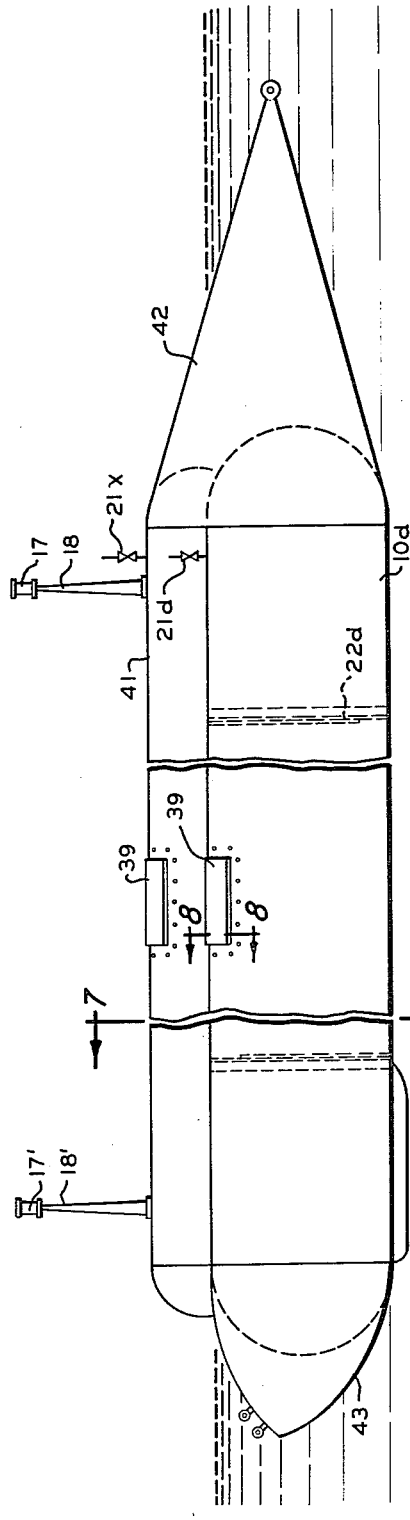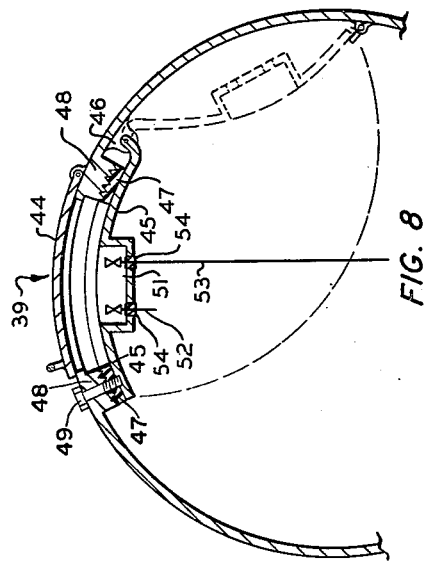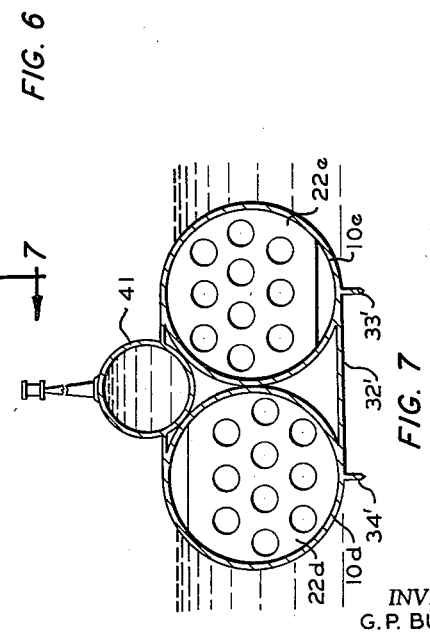

April 2, 1963 G. P. BUNN ETAL 3,083,669
MARINE VESSELS FOR VOLATILE LIQUIDS
Filed Oct. 19, 1959 4 Sheets-Sheet 4
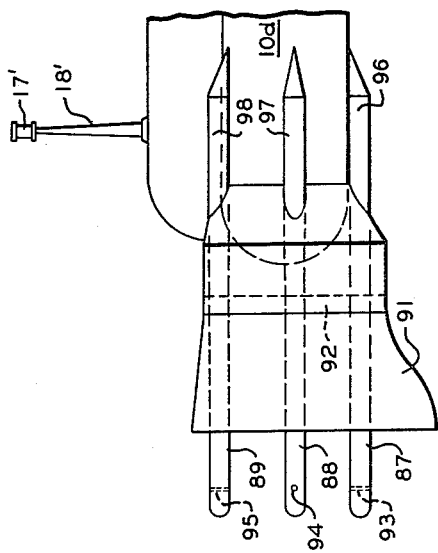
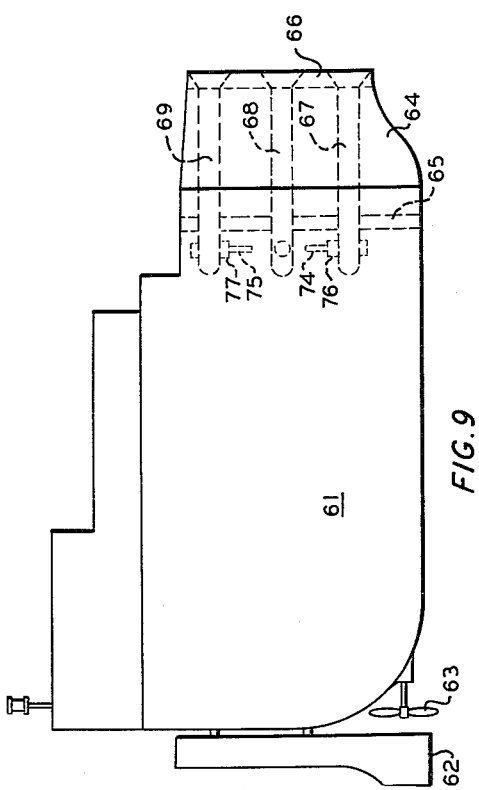
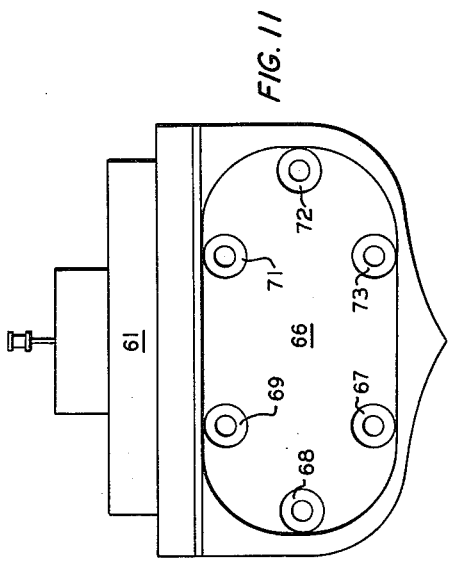
INVENTORS
G. P. BUNN
W. A. HARTMANN
BY Hudson and Young
ATTORNEYS United States Patent Office 3,083,669
Patented Apr. 2, 1963

3,083,669
MARINE VESSELS FOR VOLATILE LIQUIDS
George P. Bunn and William A. Hartmann, Bartlesville, Okla., assignors to Phillips Petroleum Company, a corporation of Delaware
Filed Oct. 19, 1959, Ser. No. 847,400
10 Claims. (Cl. 114—74)

This invention relates to vessels for the marine transportation and storage of volatile liquids under their own vapor pressure. In one aspect the invention relates to improved structures whereby an increased volume of volatile liquids can be transported and stored under their own vapor pressure. In another aspect the invention relates to a novel method for determination of the optimum dimensions of a marine vessel for transporting volatile liquids under the adverse conditions attendant marine transportation.

Marine transportation of volatile liquids has proven to be a difficult operation due to the heretofore inability to construct a suitable vessel for transporting a volatile liquid under its own vapor pressure in sufficient volume to make the operation economically feasible. It has been proposed, and practiced to a limited extent, to transport volatile liquids at atmospheric pressure by refrigerating the liquids to a temperature below their boiling point. This method eliminates the necessity for constructing the hulls of the vessels of sufficient strength to withstand the vapor pressure of such volatile liquids; however, this method requires continuous operation of refrigerating machinery with the attendant dangers resulting from a breakdown of such machinery.

It is a principal object of this invention to provide a vessel capable of transporting a sufficient quantity of volatile liquid to make the operation economically attractive.

It is a further object of this invention to construct seagoing vessels having dimensions heretofore considered impossible and impractical.

A further object of this invention is the provision of a means for converting a towed vessel into a self-propelled vessel.

Other objects and advantages and features of the invention will become apparent to those skilled in the art from study of the following disclosure, including a description of the invention and accompanying drawing, wherein:

FIGURE 1 of the drawing is a side elevational view of a single tube barge constructed according to the invention;
FIGURE 2 is a sectional view of the barge of FIGURE 1 along line 2—2;
FIGURE 3 is a cross-sectional view of a modification of the tube of FIGURE 1;
FIGURE 4 is a side elevational view of a multitube modification of the barge of the invention;
FIGURE 5 is a sectional view along lines 5—5 of FIGURE 4;
FIGURE 6 is a side elevational view of another multitube modification;
FIGURE 7 is a sectional view along lines 7—7 of FIGURE 6;
FIGURE 8 is an enlarged sectional view along lines 8—8 of FIGURE 6;
FIGURE 9 is a side elevational view of a power unit for propulsion of a barge unit;
FIGURE 10 is a side elevational view of a barge, such as shown in FIGURE 6, adapted for joinder with the power unit of FIGURE 9; and
FIGURE 11 is a front elevational view of the power unit of FIGURE 9.

Similar reference characters refer to similar elements throughout the several figures of the drawing.

Referring now to FIGURE 1, a vessel comprising a cylindrical pressure cylinder 10 having attached at the ends thereof a conical prow section 11 and a conical stern section 12 is shown. The shell 13 of the pressure cylinder 10 preferably is a continuous tubular member having convex pressure heads 14 and 15 rigidly secured thereto, as by welding. One or more pressure heads 16 can be installed in pressure cylinder 10 to act as bulkheads to separate the cargo space into compartments. Running lights 17 and 17' are supported by suitable superstructures 18 and 18' on pressure cylinder 10. Hatches 19 and 19' house connections for admitting and withdrawing cargo. The details of a preferred hatch are shown in FIGURE 8. Superstructures 18 and 18' can also provide support for vent lines, as indicated, and pressure relief valves 21 and 21'. A plurality of perforated bulkheads or splash plates 22 can be installed to prevent undue surging of the liquid in the pressure cylinder, as required. Ballast 23, as required, is positioned in the bottom of pressure cylinder 10. Towing rings 24 and 24' are secured to the prow and stern of the vessel. The prow and stern conical sections can be used to house such auxiliary equipment as batteries or a generator for the running lights. Hatches 25 and 26 provide access to the prow and stern compartments, respectively.

FIGURE 3 illustrates a lobed tube modification 10', which although less preferred to a right circular cylinder can be employed in the vessel of FIGURE 1. This type of tube has inherent internal bracing and is inherently compartmentized. The webbing which forms the partitions separating the pressure vessel into compartments can be perforated to provide communication among the various compartments. The lower deck 20 can be provided if the additional structural strength provided is desired.

FIGURE 4 illustrates a modification of the invention wherein a plurality of cylinders or tubes, for example three tubes as shown, are secured together, as by welding, to form a raft. A superstructure 27 and a deck plate 28 provide space for dry cargo. Relief valves 21a, 21b and 21c are provided to vent any gases resulting from excess pressure. A hatch 29 provides access to the dry cargo space. Hatches (not shown), such as shown in FIGURE 8, provide access to connections for filling or emptying the pressure cylinders 10a, 10b and 10c. Bumpers 31 can, if desired, be mounted on pressure cylinders 10a and 10c to act as shock absorbers for the pressure vessels. Perforated bulkheads or splash plates 22a, 22b and 22c are installed as required. A lower desk 32 and keels 33 and 34 can be secured to the bottoms of the pressure cylinders to provide additional rigidity and as an aid in maneuvering the vessel.

The vessel can be self-propelled by installing a power unit, such as a conventional marine engine or engines in the aft portion of the vessel with suitable propelling means indicated by the propeller 35. Prow section 36 and stern section 37 provide a streamlined contour to the vessel to minimize resistance to wind and water.

Another modification of the vessel of this invention is illustrated in FIGURE 6 wherein pressure cylinders 10d and 10e are secured together, as by welding, and a superstructure comprising a third pressure cylinder 41 is secured, as by welding, on top of, and in the interval between, pressure cylinders 10d and 10e. Pressure cylinder 41 is preferably smaller in diameter than 10d and 10e but can be the same size if desired. Prow section 42 and stern section 43 are similar to the prow and stern sections of FIGURE 4. Relief valves 21d and 21x are provided to vent excess pressure from the pressure cylinders.

A detail of hatch 39 is shown in FIGURE 8. This hatch is suitable also for use with the vessels of FIGURES 1 and 4, indicated as hatch 19 in FIGURE 1 and hatch 29 in FIGURE 4. The hatch cover 44 can be a conventional weatherproof hatch cover adapted to be secured in closed position by a latch or by bolts (not shown). The sealing hatch door 45 is hinged at 46 so as to swing down and provide unobstructed access to the interior of the pressure cylinder when in open position. The perimeter of the sealing hatch door has secured thereto, on its sealing side, a resilient gasket material 47, such as rubber or other material capable of providing a vapor tight seal at the anticipated maximum pressure of the confined volatile liquid cargo. The inner side of the hatch opening has a lip 48, with a serrated face adapted for contact with the gasket material. Bolts indicated at 49 secure the sealing hatch door in closed position. A well 51 in the door 45 provides space for connections such as vent 52 and loading or unloading conduit 53. The conduits 52 and 53 can be removed by means of stuffing box or packing glands 54, when it is desired to open the door 45.

The vessels illustrated in FIGURES 1, 4, and 6 as barges or towed vessels can be converted into self-propelled vessels by the novel device illustrated in FIGURES 9 and 10. The power unit 61 shown in FIGURE 9 contains conventional power means such as a marine engine or engines and the required auxiliary equipment such as rudder 62, propeller 63 and the like. The fore end of the power unit has a generally tubular shell 64 extending therefrom, sealed at the power unit end by bulkheads 65 and sealed at the fore end by bulkhead 66. A plurality of tubular sockets 67, 68, 69, 71, 72, and 73 extend from the forward bulkhead 66 through the aft bulkhead 65 and terminate in the hold of the power unit in sealed ends. The shell 64 is tapered somewhat so that the perimeter of the forward end is smaller than that of the aft end. The sealed aft ends of the sockets 67, 68, 69, 71, 72, and 73 are adapted for insertion therethrough of pins indicated as 74 and 75 by means of stuffing boxes 76 and 77. The sockets are flared outwardly at their forward ends.

FIGURE 10 illustrates the method of modifying a vessel such as that shown in FIGURE 6 for joinder with the power unit shown in FIGURE 9. A plurality of pins or rods indicated as 87, 88, and 89 are secured to the hull of pressure cylinder 10d so as to coincide with sockets 67, 68, and 69 of the power unit 61 of FIGURE 9. Similar rod members are secured to pressure cylinders 10e (not shown) for engagement with sockets 71, 72, and 73 of power unit 61. An engagement tube 91 is secured to pressure cylinder 10d at the aft end thereof and is flared outwardly so as to conform to the contour of tubular shell 64 of power unit 61. A bulkhead 92 is positioned in engagement tube 91 so as to contact bulkhead 66 when the vessels of FIGURES 9 and 10 are joined together. Rods 87, 88, and 89 have radial openings drilled therethrough as indicated at 93, 94, and 95 to accommodate pins indicated at 74 and 75 of power unit 61. Rods 87, 88 and 89 are fabricated so that the portions indicated at 96, 97 and 98 conform to the shape of pressure cylinder 10d and at the same time have the same minimum cross-sectional area as the remaining portions of the rods. In this manner the portions 97, 98 and 99 present a greater surface for welding, to the pressure cylinder 10d, without suffering a loss in structural strength.

In the construction of vessels for marine use, it has been considered that the maximum length-to-beam ratio of a seagoing vessel is 14 and vessels constructed for the transportation of volatile liquids under their own vapor pressure have been confined to this length-to-beam ratio.

A ship at sea is subjected to wave action and when the waves encountered are of sufficient magnitude to suspend the ends of the vessel on or in the crests of two waves, leaving the center portion of the ship more or less unsupported, a condition called "sagging" is encountered wherein an abnormal longitudinal stress is placed on the bottom of the vessel at its unsupported midship portion. When a vessel is supported at midship by a wave crest and the end portions of the ship are more or less unsupported in the wave troughs, a condition known as "hogging" exists wherein an abnormal longitudinal stress is placed on the upper portion of the vessel at midship.

We have discovered that the adverse effects of the conditions of hogging and sagging can be substantially eliminated or greatly reduced by controlling the degree of submergence of the vessel, particularly under empty conditions.

We provide a vessel made of one or more substantially self-supporting cylindrical steel pressure tanks, with convex heads, having a prow and stern cone attached thereto to gain hydraulic advantage when moving through the water. The steel pressure cylinders provide the hull of the vessel as well as the storage container for the volatile liquid to be transported.

In order to determine the optimum length-to-beam, or diameter, ratio for a vessel constructed according to this invention and of a material of known stress value, the most severe stress conditions of hogging and sagging can be determined by recognized methods of calculation, such as those found in a standard text on structural analysis, for each set of conditions of degree of submergence, maximum internal pressure, length and circumference. The maximum longitudinal stress, which is the sum of stress caused by internal pressure and stress caused by imposed external forces, should not exceed the internal circumferential stress. The shell thickness for any material of known stress value will be determined by the maximum circumferential stress anticipated.

We have determined that the length-to-diameter ratio of a cylindrical vessel for marine transportation of volatile liquids can be from 17 to 20 or more, provided the degree of submergence is such that the maximum longitudinal stress anticipated does not exceed the circumferential stress. This is shown in the following tables wherein vessels of the design condition shown in Table I are subjected to stresses shown in Table II.

TABLE I

*Design Conditions—Cylindrical Vessels for the Transport of Propane on the Seas*

Vessels have semi-spherical heads at end.
Vessels have right conical end sections.
Length of cone=2×I.D. of vessel Steel:
    A–201—Allowable stress=15K/sq. in.=15,000 lbs./sq. in.
    HY80—Allowable stress=25K/sq. in.=25,000 lbs./sq. in.
Corrosion allowance=$\frac{1}{16}$ inch Design pressure:
    In port at 100° F.=210 p.s.i.
    At sea at 85° F.=170 p.s.i.

Liquid propane to occupy 97% of void within vessel.

Specific gravity of propane=.51
Specific gravity of sea water=1.026

Wt. misc. piping 125#/ft. (between tangents)

TABLE II

*Cylindrical Propane Barge Data*

| | Run I | Run II | Run III | Run IV |
|---|---|---|---|---|
| Type of Steel | A-201 | A-201 | A-201 | HY80 |
| Inside Diameter=I.D | 13'-0" | 13'-0" | 36'-0" | 50'-0" |
| Outside Diameter=O.D | 13'-2½" | 13'-2½" | 36'-6" | 50'-5" |
| Length (T. to T.)=$L_1$ | 210'-0" | 210'-0" | 480' | 660 |
| Length (over-all)=$L_2$ | 262'-0" | 262'-0" | 624' | 860 |
| $L_2 \div I.D$ | 20.15 | 20.15 | 17.33 | 17.2 |
| Shell Thickness | 1¼" | 1¼" | 3" | 2½" |
| Head Thickness | ⅞" | ⅞" | 1⅝" | 1⅜" |
| Cone Thickness | 1¼" | 1¼" | 1¼" | 1½" |
| Longitudinal Stress at 170#/sq. in. Press. (K/sq. in.) | 5.64 | 5.64 | 5.99 | 10.5 |
| Longitudinal Stress at 210#/sq. in. Press. (K/sq. in.) | 6.92 | 6.92 | 7.41 | 13.0 |
| Circumferential Stress at 170#/sq. in. Press. (K/sq. in.) | 11.28 | 11.28 | 11.99 | 21.0 |
| Circumferential Stress at 210#/sq. in. Press. (K/sq. in.) | 13.93 | 13.93 | 14.81 | 26.0 |
| Long. Stress from Moment (Vessel Full-sagging Cond.) | 3.48 | 3.77 | | |
| Long. Stress from Moment (Vessel Empty-sagging Cond.) | 5.82 | 6.59 | | |
| Long. Stress from Moment (Vessel Full-hogging Cond.) | 2.38 | 3.19 | | |
| Long. Stress from Moment (Vessel Empty-hogging Cond.) | 5.88 | 7.31 | 9.07 | 14.7 |
| Lbs./ft. of Internal Ballast (between tangents) | 1000 | 1000 | 500 | 750 |
| Wave Length=$L_2$ | 260' | 260' | 480' | 660 |
| Wave Height=$H_2$ | 13' | 20' | 36' | 44 |
| $Lw \div Hw$ | 20 | 13 | 15 | 15 |
| Total Long. Stress (at Sea-Vessel Full-Sagging Cond.) (K/sq. in.) | 9.12 | 9.41 | | |
| Total Long. Stress (at Sea-Vessel Empty-Sagging Cond.) (K/sq. in.) | 11.46 | 12.23 | | |
| Total Long. Stress (at Sea-Vessel Full-Hogging Cond.) (K/sq. in.) | 8.02 | 8.83 | | |
| Total Long. Stress (at Sea-Vessel Empty-Hogging Cond.) (K/sq. in.) | 11.52 | 12.95 | 15.06 | 25.2 |
| Capacity of Propane (Bbl.) | 5,100 | 5,100 | 88,550 | 223,000 |
| $\pi(I.D.)^2 \div 4 \times Wt.$ of Ballast (Sq. Ft.÷#/Ft.)=(Cu. Ft./Lb.) | .1328 | .1328 | 2.04 | 2.62 |
| Draft Full=$D_f$ | 10.1' | 10.1' | 23.0 | 28.0' |
| Draft Empty=$D_e$ | 5.4' | 5.4' | 10.2 | 10.3' |
| $D_f \div O.D$ | .778 | .778 | .639 | |
| $D_e \div O.D$ | .416 | .416 | .284 | |
| Displacement—Empty (Tons) | 381 | 381 | 3,915 | 6,453 |
| Displacement—Full (Tons) | 823.6 | 823.6 | 11,826 | |
| Wt. Shell+Heads+Cones (Tons) | 262.7 | 262.7 | 3,765 | 6,129 |
| Total Submerged Displacement (Tons) | 995 | 995 | | |

In Table II the tangent to tangent (T to T) length is the length of the cylinder without the heads and end cones. Runs I, II and III were made with steel having an allowable stress of 15K/sq. in and run IV was made with steel having an allowable stress of 25K/sq. in.

Reference to Table II shows that the most severe longitudinal stresses occur in a cylindrical vessel during hogging conditions with the vessel empty. The stresses, however, are within reasonable safety limits with length to diameter ratios of 17:1 and 20:1 with the shell thickness indicated. If dead weight ballast is added, the increase in stress imposed under conditions of hogging and sagging is greater than the decrease in stress obtained by the greater degree of submergence until the amount of ballast added is sufficient to effect about 60 percent submergence with the vessel full. Since the stresses imposed on the hull, by hogging and sagging, occur at the top and bottom of the vessel at midship, the length to diameter ratio can be increased by adding ballast, as the length is increased, to the center portion of the pressure cylinder in the form of thicker shell at the top and bottom of the cylinder. Thus, as ballast is added, the structural strength of the shell is increased at the point of greatest stress. This is conveniently accomplished by adding a center cylinder portion to the vessel of greater shell thickness.

The above discussion with respect to ballast is directed to ballast in addition to the ballast required to maintain the trim and stability of the vessel. This ballast, which can be referred to as permanent ballast, is permanently secured along the keel of the vessel. Since the ballast normally will occupy space otherwise available for cargo, it is desirable that the density of the ballast be as great as possible within practical limits. Readily available materials of great density which are suitable as permanent ballast include lead, barium sulfate-containing Portland cement, iron, steel, and the like.

Reasonable variations and modifications are possible within the scope of this disclosure without departing from the spirit and scope of the invention.

That which is claimed is:

1. A vessel for the marine transportation and storage of volatile liquids under their own vapor pressure comprising an elongated, cylindrical, pressure-resistant container of length-to-diameter ratio of about 17:1 to 20:1, having substantially hemispherical, pressure-resistant ends adapted to withstand an internal pressure of at least about 210 p.s.i., the wall of the container forming the wall of the vessel and the wall thickness at the center portion of the cylinder being greater than the wall thickness of the remainder of the container; substantially conical, hollow end members enclosing each of said hemispherical ends; ring members attached to said conical members adjacent the apex thereof to tow said vessel; ballast means in said container to maintain the trim and amount of submergence of said vessel; and a port means to introduce and to withdraw liquid.

2. The vessel of claim 1 wherein the ballast is sufficient to maintain the vessel from about 60 to about 90 percent submerged when filled with volatile liquid.

3. The vessel of claim 1 wherein the ballast is sufficient to maintain the vessel from about 60 to about 90 percent submerged when filled with a volatile fluid, and a portion of the ballast comprises the greater shell thickness of the center section of the vessel.

4. A vessel for the marine transportation and storage of a volatile liquid under its own vapor pressure comprising a plurality of elongated, cylindrical, pressure-resistant containers, having a greater wall thickness at the center portion and having a length-to-diameter ratio of about 17:1 to about 20:1, secured rigidly together in substantially side-by-side horizontal relationship; a deck plate mounted upon and rigidly secured to said containers; a deck plate secured to the bottom of said containers; means for adding liquid to and withdrawing liquid from said containers; a substantially hemi-cylindrical cover member attached to said top deck plate and to the tops of the outermost of said containers; a substantially conical prow section secured to one end of said cylinders and to said hemi-cylindrical cover member; a substantially conical stern section secured to the other end of said containers and the other end of said hemi-cylindrical cover member; and a powered propeller means secured to said stern section to propel said vessel through the water.

5. A vessel for the marine transportation and storage of a volatile liquid under its own vapor pressure comprising a plurality of elongated, cylindrical, pressure-resistant containers rigidly secured together in contiguous, substantially side-by-side relationship in a horizontal plane, said containers having a greater wall thickness at the center portion and having a length-to-diameter ratio of about 17:1 to about 20:1; an elongated, cylindrical, pressure-resistant container of smaller diameter than the aforesaid containers, rigidly secured to said aforesaid containers in the interval above and between the aforesaid containers to contain a third separate supply of liquid; means to add liquid to and withdraw liquid from each of said containers; a substantially conical prow section attached to and enclosing said containers at one end thereof; and a substantially conical stern section attached to and substantially enclosing said containers at the other end thereof.

6. The vessel of claim 5 wherein the means to add liquid to and withdraw liquid from each of said containers comprises an opening through the wall of the container; a weatherproof hatch cover hinged at one side to the exterior of said container and adapted to inclose the opening in said container; a shoulder extending inwardly around the perimeter of the opening in said container and having a serrated exposed face; a sealing door member hinged on the inside of said container adjacent the opening thereof and having a resilient gasket material attached to its perimeter for engagement with the serrated face of said shoulder when in closed position; a first stuffing box secured to said door member and having a passageway therethrough for a vent conduit; a vent conduit positioned in said first stuffing box; a pressure relief valve positioned in said vent conduit; a second stuffing box positioned on said door member and having a passageway therethrough for a liquid transfer conduit; a liquid transfer conduit positioned in said second stuffing box; a valve in said liquid transfer conduit; and means to secure said door member in closed position.

7. Apparatus for converting a cylindrical pressure-resistant barge into a self-propelled vessel comprising a powered boat adapted for marine service having a prow of substantially truncated conical shape; a plurality of sockets in the truncation at the forward end of said boat and extending into the hold of said boat; a cylindrical barge; a plurality of rods secured to the sides of said barge and extending longitudinally past the end of said barge and adapted to coincide with the sockets of said boat; a shell member extending from the end of said barge and adapted to conform to the truncated conical section of said boat; and means to secure said rods in said sockets so as to unite the barge and the boat into an integral marine vessel, said cylindrical barge comprising a cylindrical pressure-resistant container having a length-to-diameter ratio of about 17:1 to about 20:1 having a wall thickness at the center portion of said container greater than the wall thickness of the remainder of the container and having concave, pressure-resistant ends; a substantially conical, hollow prow member having a length about twice the diameter of said container secured in sealing engagement with, and enclosing the end of the container opposite the extending rods; ballast means in said container to maintain said barge from about 60 to about 90 percent submerged when filled with volatile liquid; and means in said container to introduce and withdraw liquid cargo.

8. A vessel for the marine transportation and storage of a volatile liquid under its own vapor pressure comprising a cylindrical pressure-resistant container having a greater wall thickness at the center portion and having a length-to-diameter ratio of about 17:1 to about 20:1 and having concave, pressure-resistant ends; a substantially conical, hollow member having a length about twice the diameter of said container secured in sealing engagement with and enclosing each end of said container; access means in each of said conical members; ballast means in said container to maintain the trim and amount of submergence of said vessel; running lights positioned on superstructures positioned on the top of said vessel; means attached to each end of said vessel to tow said vessel; port means to introduce and to withdraw liquid cargo; and means to vent excessive pressure from said container.

9. The vessel of claim 8 wherein said container comprises a plurality of lobal sections of cylinders joined together longitudinally and internally trussed with partition members joined to the points of lobal intersection.

10. The vessel of claim 8 wherein a plurality of splash plates are positioned normal to the longitudinal axis of said container.

References Cited in the file of this patent

UNITED STATES PATENTS

| Re. 651 | Winans | Jan. 25, 1859 |
|---|---|---|
| 23,010 | Burling | Feb. 22, 1859 |
| 504,120 | Winans | Aug. 29, 1893 |
| 733,583 | Harvey | July 14, 1903 |
| 1,277,943 | Keall | Sept. 3, 1918 |
| 1,284,689 | Jack | Nov. 12, 1918 |
| 1,303,690 | Leparmentier | May 13, 1919 |
| 1,313,529 | Durham | Aug. 19, 1919 |
| 1,458,134 | Constan | June 12, 1923 |
| 1,510,283 | Lake | Sept. 30, 1924 |
| 1,779,429 | Grieshaber | Oct. 28, 1930 |
| 1,814,689 | Grieshaber | July 14, 1931 |
| 2,290,038 | Folmsbee | July 14, 1942 |
| 2,375,139 | Schmitt et al. | May 1, 1945 |
| 2,379,295 | Gunning | June 26, 1945 |
| 2,600,015 | McLaughlin | June 10, 1952 |
| 2,692,570 | Costa | Oct. 26, 1954 |
| 2,715,380 | Archer | Aug. 16, 1955 |
| 2,720,082 | Brandon | Oct. 11, 1955 |
| 2,724,358 | Harris et al. | Nov. 22, 1955 |
| 2,725,027 | Brandon et al. | Nov. 29, 1955 |
| 2,727,485 | Combs | Dec. 20, 1955 |

FOREIGN PATENTS

| 108,152 | Great Britain | 1919 |
|---|---|---|
| 153,596 | Great Britain | Aug. 11, 1921 |
| 269,165 | Italy | Nov. 12, 1929 |
| 368,014 | Germany | Jan. 30, 1923 |
| 564,485 | Great Britain | Sept. 29, 1944 |
| 754,275 | France | Aug. 21, 1933 |
| 790,877 | Great Britain | Feb. 19, 1958 |
| 1,159,028 | France | Feb. 3, 1958 |
| 1,210,934 | France | Oct. 5, 1959 |